United States Patent [19]

Letovsky

[11] Patent Number: 4,584,896
[45] Date of Patent: Apr. 29, 1986

[54] PIVOT AND TRANSLATION MOTION CONTROL APPARATUS

[76] Inventor: Howard Letovsky, 1929 N. Curson, Hollywood, Calif. 90046

[21] Appl. No.: 773,105

[22] Filed: Sep. 6, 1985

Related U.S. Application Data

[63] Continuation of Ser. No. 545,121, Oct. 25, 1983, abandoned.

[51] Int. Cl.⁴ ........................................... G05G 11/00
[52] U.S. Cl. .................................... 74/479; 74/89.15; 434/55; 434/57
[58] Field of Search ............... 74/89.15, 479; 434/55, 434/57, 58

[56] References Cited

U.S. PATENT DOCUMENTS

| | | | |
|---|---|---|---|
| 1,949,414 | 3/1934 | Foulk | 434/55 X |
| 2,362,190 | 11/1944 | Cortes | 434/55 X |
| 2,485,266 | 10/1949 | Edinburg | 434/55 X |
| 2,695,783 | 11/1954 | Serafin | 434/55 |
| 3,398,484 | 8/1968 | Katsumura | 74/89.15 X |
| 3,402,613 | 9/1968 | Neusel et al. | 74/89.15 |
| 3,496,650 | 2/1970 | Kimball et al. | 434/55 |
| 3,613,464 | 10/1971 | Archer | 74/89.15 |
| 3,623,574 | 11/1971 | Gardner | 74/89.15 X |
| 3,984,924 | 10/1976 | Myles et al. | 434/55 X |
| 4,303,236 | 12/1981 | Czarnecki . | |

Primary Examiner—A. Michael Chambers
Assistant Examiner—John C. Fox
Attorney, Agent, or Firm—John Ley

[57] ABSTRACT

A multiple axis pivot movement control mechanism includes an actuator operatively connected between the relatively pivotable elements at positions spaced laterally from the pivotal axis. The actuator preferably includes a threaded shaft, a threaded collar received on the threaded shaft and pivotably connected to one of the relatively pivotable elements, a bearing assembly connected to the other relatively pivotable element and rotationally supporting the other end of the shaft and transferring axial forces to its connected relatively pivotable element and a motor which operatively rotates the shaft to create pivoting movement. At least one spring or other force inducing element may be connected between the relatively pivotable elements to apply force to counteract the torque effect created when the center of gravity of the object shifts laterally during pivoting movement. A translational movement control mechanism includes a lift arm pivotally connected to a base structure, and an acutator of essentially the same characteristics operatively connected between the base structure and the lift arm. Independent pivotable movement about each of the three mutually perpendicular axes and simultaneous translational movement is also possible.

14 Claims, 6 Drawing Figures

PIVOT AND TRANSLATION MOTION CONTROL APPARATUS

This is a continuation of application Ser. No. 545,121, filed 10/25/83, now abandoned.

This invention pertains to an apparatus capable of pivotable or rotational movement about three mutually perpendicular axes and which is also capable of simultaneous translational movement along at least one of these axes. More particularly, the present invention pertains to improvements in a pivoting mechanism and a translational movement mechanism for such apparatus.

The present invention is useful in a variety of different applications, among them are games and amusement devices, mechanically controlled positioning and orienting devices such as robots, flight trainers and motion simulators.

BACKGROUND OF THE INVENTION

Common flight trainers and motion simulators use hemispherical cradle support apparatus or gimbal ring apparatus to obtain pivoting and rotational movement about at least two of the three mutually perpendicular axes. The cradle and gimbal ring arrangements are somewhat mechanically complex and are inherently space consuming because of the size of the apparatus involved. Usually, a simulated cockpit is provided for seating the "pilot" or user. Both the user and the simulated cockpit are moved to simulate flight or motion. Furthermore, if full three hundred sixty degree movement about the three mutually perpendicular axes is to be obtained, a gimbal ring arrangement must be employed. The size of the gimbal rings must be sufficiently large to encircle the cockpit and the user. Cradle arrangements, although usually not obtaining full three hundred sixty degree movement, are also quite large in order to create realistic pivoting movement and to accommodate the size and weight of the simulated cockpit and the user. The mechanisms required to drive the gimbal rings with respect to one another and to move the cradles are also large and complex due to the size and weight of the mechanisms which they drive. Such gimbal ring and cradle devices are generally not suited to applications where size and space consumption limitations are present.

It is also desirable to have the capability to move the cockpit and user in translational movement along one of the axes, usually the vertical axis. Vertical movement accustoms the user to the feel and effects of gravity. To translate the cockpit and user vertically when a gimbal ring or cradling arrangement is employed requires some very complex mechanisms capable of lifting a relatively large frame structural support for the gimbal rings or cradles.

Motion control mechanisms which connect directly to and pivotably act on the seat in which the user sits or on the cockpit are also known. Some of these motion control mechanisms utilize electric motors connected through gears to rotate the seat or cockpit about the pivot axes. Such arrangements typically require mechanical clutches to prevent the motor from overdriving the mechanism. Direct pivot gear mechanisms inherently provide some pivot play due to gear backlash. Starting forces may also be substantial due to the direct connection to the pivot axis, requiring motors of increased capacity.

Vertical translation movement devices have been employed in some types of amusement rides and the like in which the motion control mechanism also offers limited additional pivotal movement of the user's seat. Usually, such translational movement devices are hydraulically operated lifts, which require electric driving motors, pumps, cylinders, fluid storage tanks, flexible and rigid conduits, etc. The relative technical complexity and the potential for fluid leaks makes such systems disadvantageous for use in many situations and environments.

Other limitations, disadvantages and aspects of the prior art are also known. It is with respect to these considerations that the improvements of the present invention are to be viewed.

BRIEF SUMMARY OF THE INVENTION

The present invention obtains substantial improvements in pivot movement control mechanisms which are directly connected to pivot the user's seat or cockpit about two or three mutually perpendicular axes, and in translational movement control mechanisms to thereby obtain pivoting or rotational movement about three mutually perpendicular axes while simultaneously translating the user's seat or cockpit along one axis such as along the vertical axis. The improvements in the motion control mechanism offer enhanced reliability in securing precise movement without the disadvantages typical of the prior art of excessive size and gear play, undue mechanical complexity, and excessive force or torque requirements in order to achieve the degree of rotation or pivoting movement desired. The present invention also offers an ability to maintain an articulated position without continual energization of the motor or without use of clutch or brake arrangements. The vertical translational movement features of the present invention are obtained by use of an actuating mechanism similar to that employed in the pivot control mechanism, thereby eliminating the relative mechanical complexity and uncleanliness typical in hydraulic systems.

According to one of its aspects, an improved pivot movement control mechanism of the present invention comprises a support member operatively connected to pivot about an intermediate structure and pivot actuator means operatively connected between the support member and the intermediate structure at positions laterally displaced from the pivot axis to pivot the support member about the pivot axis relative to the intermediate structure. The pivot actuator means preferably comprises an elongated shaft having a segment of threads. A pivot bearing assembly is operatively connected to rotationally support one end of the pivot shaft from one of the support member or the intermediate structure. A threaded collar is threadably received on the threaded segment of the shaft and is pivotably connected to the other one of the support member or intermediate structure to which the bearing assembly is not connected. A motor means operatively rotates the shaft and thereby advances the collar along the threaded segments of the shaft. Axial forces on the shaft are transferred to the bearing assembly and to its connected support member or intermediate structure. The motor need not withstand the forces created by the torque and off-center positioning of the object attached to the support plate. To further counteract the torque forces on the pivoted support plate created when the center of gravity of the object is shifted laterally of the pivot axis, torque means are operatively connected between the support member and the intermediate structure. The torque means includes spring by which force is operatively derived and applied to pivot the support member relative to the intermediate structure toward an initial predetermined orientation, once the support member is pivoted away from the initial predetermined position. The spring of the torque means counteracts the lateral shifting of the center of gravity of the object and thereby reduces the force required on the motor to pivot the object and the support member back to the initial predetermined position. The pivot motion control mechanism additionally may include a second support member pivotably connected to the intermediate structure and a second pivot actuator means operatively connected between the second support member and the intermediate structure. Independent dual axis pivot movement control is available.

According to another of its aspects, a translational movement control mechanism of the present invention comprises a base structure adapted for supporting the mechanism and a lift arm pivotably connected to the base structure to pivot about a lift pivot axis. A lift actuator means is operatively connected between the base structure and the lift arm at positions laterally displaced from the lift pivot axis. The lift actuator means is of similar construction to the pivot actuator means. By attaching the pivot motion control mechanism to the other end of the lift arm, fully independent and controllable pivoting movement can be obtained while translational movement is simultaneously achieved. Preferably, the pivot movement control mechanism is attached to the outer end of the lift arm by a carrier member. The carrier member is pivotably connected to the outer end of the lift arm. A stabilizer arm extends parallel to the lift arm and is connected at its opposite end between the carrier member and the base structure. The lift arm and the stabilizer arm define a parallel link structure which maintains the carrier member in a predetermined orientation as the lift arm pivots. Preferably, the pivot movement control mechanism is rotationally or pivotably mounted to the carrier member to provide pivoting movement in a third axes. When the axes of the pivot movement control mechanism are oriented in a mutually perpendicular relationship, fully independent pivoting movement in three mutually perpendicular axes is possible along with simultaneous translational movement.

The details and significance of the improvements available from the present invention can be more completely understood from the drawings, a description of a preferred embodiment of the present invention, and from the appended claims.

DESCRIPTION OF THE PREFERRED EMBODIMENT

Figure 1:
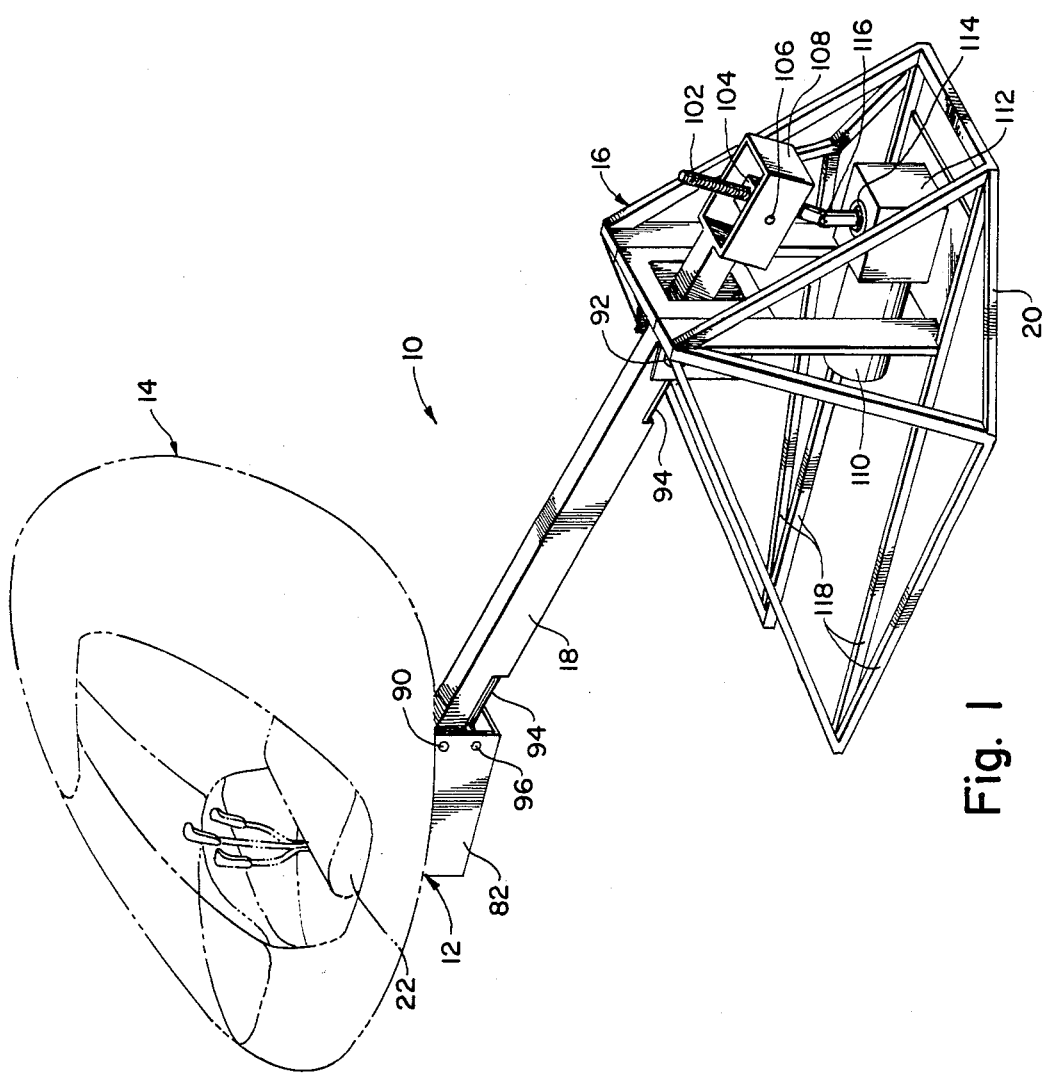
FIG. 1 is a perspective view of an orienter embodying the present invention, upon which an exemplary amusement game occupant cockpit is connected to be pivoted about three mutually perpendicular axes by a pivot movement control mechanism while allowing independent translational movement primarily along a vertical path by a translational or lift movement control mechanism.

A presently preferred example of an orienter 10 in which the present invention is embodied is illustrated in FIG. 1. The orienter 10 includes a pivot movement control mechanism, generally referenced 12, which operatively pivots an object 14 about three mutually perpendicular axes. The mutually perpendicular axes are a vertical axis and the two mutually perpendicular axes in the horizontal plane. The pivot capability about the three axes allows the object 14 to be moved with pitch, roll and yaw, and thereby achieve full three-dimensional movement. In order to translate the object 14 primarily along a vertical movement path, while allowing full independent pivoting movement about the three mutually perpendicular axes, a lift or translational movement mechanism 16 is provided. The translational movement mechanism 16 comprises a lift arm 18 which is pivotably connected at one end to a base structure 20. At the other end of the lift arm 18, the pivot control mechanism 12 is operatively connected. By pivoting the lift arm 18 with respect to the base structure 20, the object 14 is lifted. The base structure 20 supports the orienter 10 from a horizontal surface.

An amusement game simulated cockpit 22 is illustrated as an exemplary object. The user can enter the cockpit 22 and control the operation of the orienter 10 from controls inside the cockpit 22. The controls are electrically connected to a control system (not described) to create the desired pivoting and translational movement. Such control systems are conventional.

Figure 2:
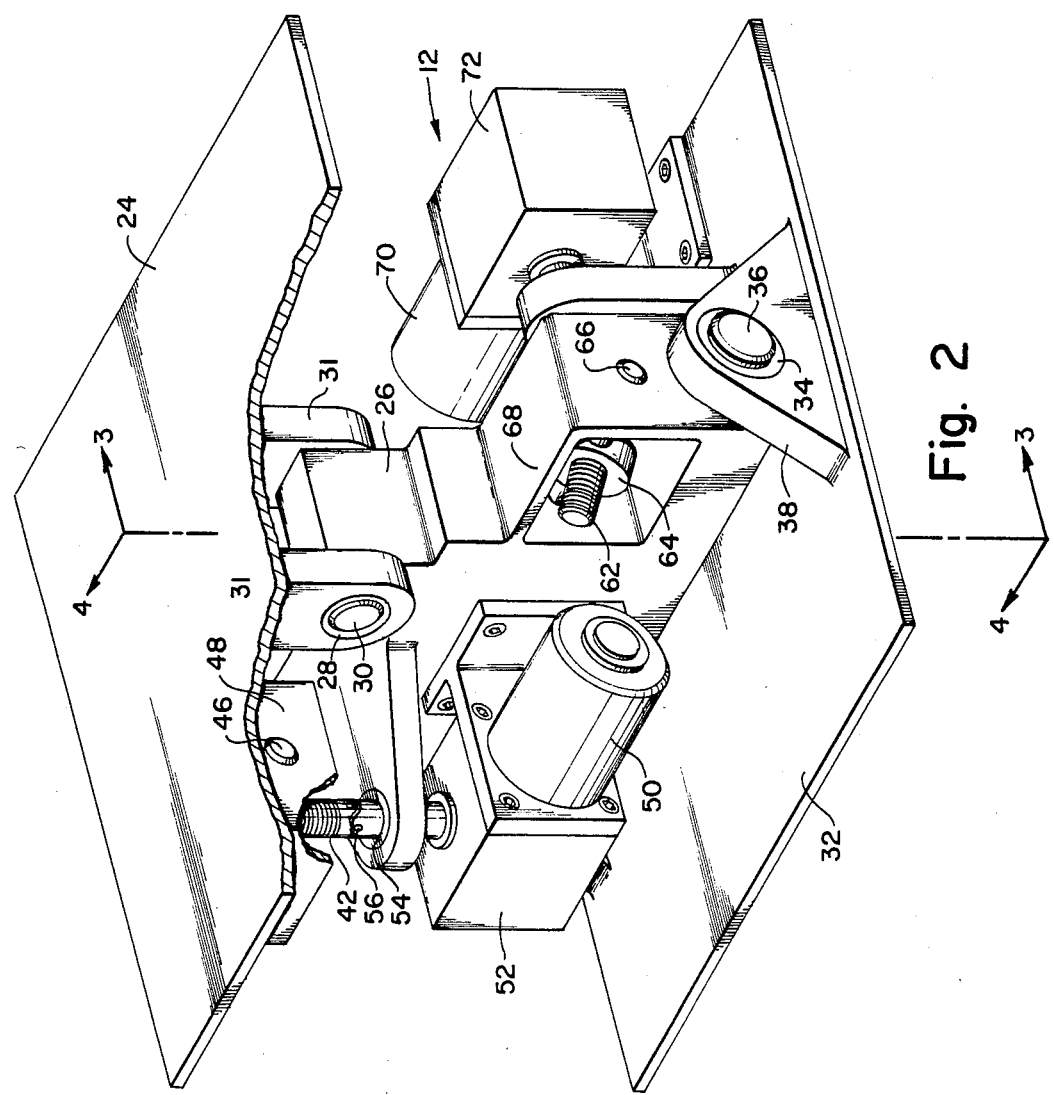
FIG. 2 is a perspective view of a portion of the pivot movement control mechanism of the orienter shown in FIG. 1, with certain portions broken out for clarity.
Figure 4:
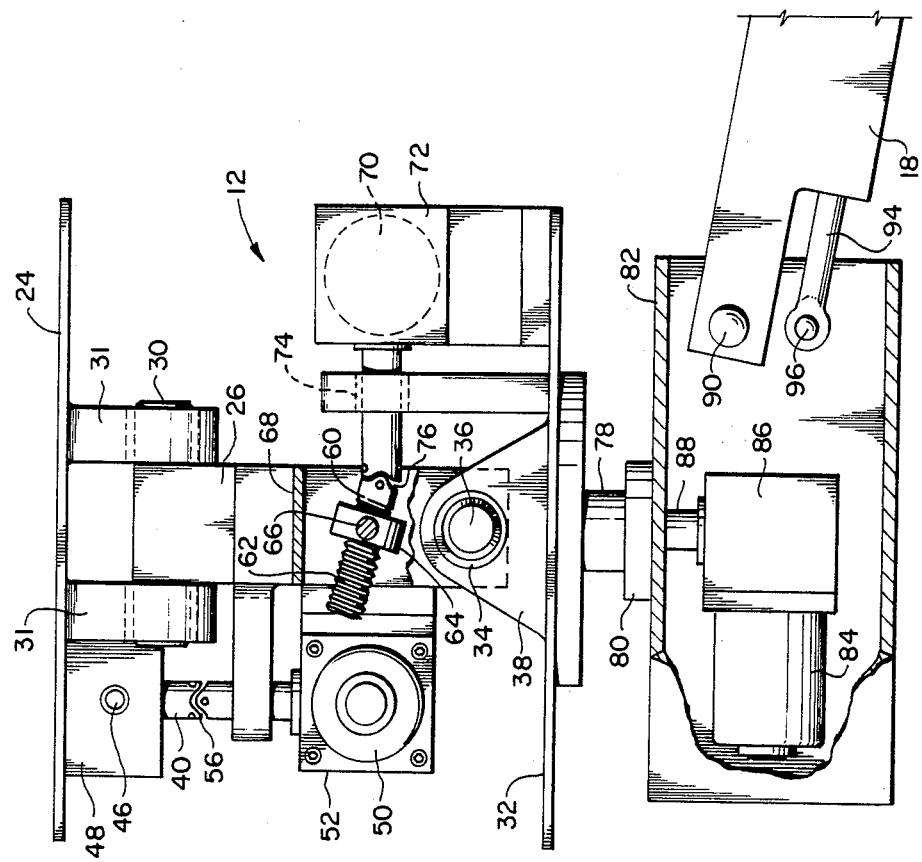
FIG. 4 is a section view through the pivot movement control mechanism and a portion of the lift movement control mechanism attached thereto, taken substantially in the plane of line 4—4 in FIG. 2, with certain portions broken away, the plane of line 4—4 being substantially perpendicular to the plane of line 3—3 in FIG. 2.
Figure 3:
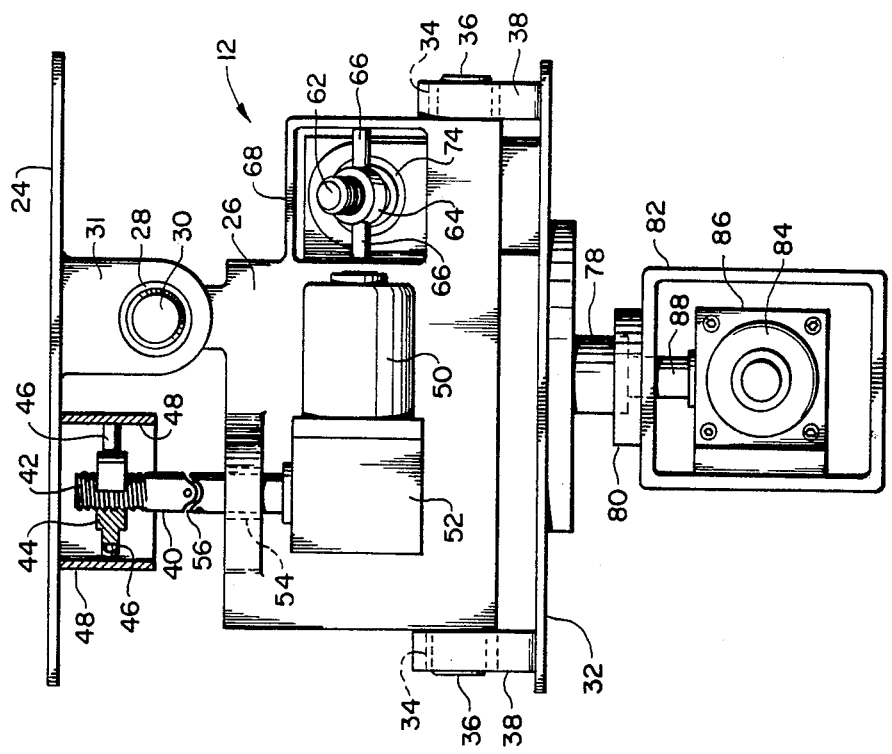
FIG. 3 is a section view through the pivot movement control mechanism and a portion of a translational or lift movement control mechanism of the present invention, with certain portions broken away, taken substantially in the plane of line 3—3 in FIG. 2.

Details of the pivot control mechanism are shown in FIGS. 2, 3 and 4. The pivot control mechanism 12 includes an upper support member or plate 24 to which the cockpit 22 (FIG. 1) is mechanically attached. The upper plate 24 is pivotably connected to an intermediate structure 26 by a pair of bearings 28 and an upper pivot shaft 30. The bearings 28 are rigidly connected to the upper plate 24 by U-shaped hangers 31. The bearings 28 rotationally retain the pivot shaft 30, and the pivot shaft 30 is rigidly attached, as by welding, to the intermediate structure 26. In this manner, a pivotable connection is achieved by which the upper plate 24 pivots with respect to the intermediate structure 26 about the pivot axis defined by the shaft 30.

A lower support member or plate 32 is also pivotably connected to the intermediate structure 26. A pair of lower bearings 34 rotationally retain opposite ends of a lower pivot shaft 36. The bearings 34 are rigidly connected to the lower plate 32 by U-shaped hangers 38. The lower pivot shaft 36 is rigidly attached to the intermediate structure 26, as by welding. The lower pivot shaft 36 lies in a plane generally parallel to the plane in which the upper pivot shaft 30 is positioned, and the two pivot shafts 30 and 36 are intersectably angled in a mutually perpendicular relationship with one another. As a result of this connection arrangement, the intermediate structure 26 is pivotable about a pivot axis through the shaft 36 with respect to the lower plate 32.

The upper plate 24 therefore pivots in a plane which is mutually perpendicular to the direction in which the lower plate 32 pivots. Pitch and roll movements are possible as a result of the perpendicular pivoting movement of the support plates 24 and 32 relative to one another and to the intermediate structure 26.

In order to operatively pivot each support plate 24 and 32 relative to the intermediate structure 26, pivot actuator means are provided. The pivot actuator means which operatively pivots the upper plate 24 relative to the intermediate structure 26 comprises a pivot or actuator shaft 40 having a threaded segment or portion 42 at one end thereof, as is shown in FIG. 3. An internally threaded collar 44 is threadably connected to the threaded shaft portion 42. To pivotably connect the threaded collar 44 to the upper support plate 24, a pair of pivot pins 46 are rigidly attached to and extend outward from the collar 44. The pins 46 are pivotably connected by conventional means to a rectangular receptacle 48 which is rigidly attached, as by welding, to the bottom of the upper support plate 24. The collar 44 is thereby free to pivot about the axis through the pivot pins 46. An electric motor 50 is connected to the other end of the actuator shaft 40. The electric motor 50 drives the actuator shaft 40 through a conventional gear box 52. A bearing assembly 54 rotationally supports the other end of the actuator shaft 40. A universal joint mechanism 56 is interposed in the actuator shaft 40 between the end operatively connected to the gear box 52 and the threaded portion 42. The electric motor 50, gear box 52 and the bearing assembly 54 are all rigidly connected to the intermediate structure 26. The motor 50, gear box 52 and bearing 54 all move in unison with the intermediate structure 26.

The bearing assembly 54 rotationally supports the end of the shaft 40. The bearing assembly 54 has a thrust bearing capability for transferring any axial forces on the actuator shaft 40 to the intermediate structure 26, by virtue of the direct mechanical connection of the bearing assembly 54 to the frame portion 56 of the intermediate structure. The end of the actuator shaft 40 which is operatively connected to the gear box 52 and retained by the bearing 54, is positioned on the intermediate structure 26 at a location laterally spaced from the pivot axis through the pivot shaft 30, as is shown best in FIG. 3. Similarly, the location at which the collar 44 is operatively pivotably connected to the receptacle 48 and the upper plate 24 is at a location laterally displaced from the pivot axis through the upper pivot shaft 30, as is also shown best in FIG. 3. Accordingly, when the actuator shaft 40 is rotated by the electric motor 50, the threaded collar 44 advances along the threaded portion 42 by virtue of the threaded connection. The effective length of the mechanical link between the bearing assembly 54 and the threaded collar 44 changes, thus causing the upper support plate 24 to pivot relative to the intermediate structure 26 about the upper pivot axis at the pivot shaft 30. Reverse rotation of the actuator shaft 40 causes pivoting in the opposite direction. As pivoting occurs, the universal joint connection 54 allows the threaded shaft portion 42 to angle while rotating relative to the portion of the shaft 40 connected to the gear box 52. Similarly, the upper pivotable connection of the collar 44 to the receptacle 48 likewise accommodates slight pivoting movement of the threaded shaft portion 42 relative to the upper support plate 24.

A similar pivot actuator means is connected between the intermediate structure 26 and the lower pivot plate 32 in order to pivot the lower plate 32 relative to the intermediate structure 26 and vice versa. The function and components of the pivot actuator means operative between the lower plate 32 and the intermediate structure 26 are the same as the pivot actuator means operative between the upper pivot plate 24 and the intermediate structure 26. Accordingly, the components of the second pivot actuator means are only briefly described, primarily in conjunction with FIG. 4.

A second pivot or actuator shaft 60 includes a threaded portion 62 which is threadably received by an internally threaded collar 64. Pivot pins 66 of the collar 64 extend outward and pivotably connect to a receptacle 68 which is a part of the intermediate structure 26. An electric motor 70 is operatively connected to the other end of the actuator shaft 60 through a gear box 72. The motor 70 and gear box 72 are rigidly connected to the lower plate 32. A bearing assembly 74 rotationally supports the other end of the actuator shaft 60 and has a thrust resisting capability to transfer axial forces and transfers those axial forces to the lower support plate 32, in the same manner as does bearing assembly 54. Of course, the bearing assembly 74 is rigidly retained to the lower support plate. A universal connection joint 76 is located in the actuator shaft 60 between the threaded shaft portion 62 and the other end connected to the gear box 72. Upon rotation of the shaft 60 by the motor 70, the intermediate structure 26 is pivoted about the pivot axis through the lower pivot shaft 36. Of course, reverse rotation of the actuator shaft 60 pivots the intermediate structure 26 in the other direction relative to the lower plate 32.

The foregoing description of apparatus of the pivot movement control mechanism 12 may be described as a dual axis pivot control mechanism, in that the intermediate structure 26 is pivoted about the axis through the lower pivot shaft 36 to obtain roll movement, for example, of the upper support plate 24, since the upper support plate is connected to the intermediate structure in a manner incapable of pivoting relative to the intermediate structure 26 about the axis of the lower support shaft 36. The upper support plate may be independently pivoted in the other mutually perpendicular direction to obtain pitch movement, for example.

In order to rotate or pivot the object 14 around a vertical axis, and thereby obtain yaw movement, a third pivoting means is provided, as is shown in FIGS. 3 and 4. A shaft 78 is rigidly connected to the bottom of the lower support plate 32 and extends downward therefrom. A bearing assembly 80 rotationally supports the shaft 78 and transfers axial forces therefrom to a carrier member 82. The carrier member 82 is pivotably connected to the outer end of the lift arm 18. The carrier member 82 is hollow and has positioned within its interior an electric motor 84 and connected gear box 86. An output shaft 88 of the gear box 86 is directly connected to the shaft 78. Upon energizing the motor 84, the gear box 86 rotates the output shaft 88 and the directly connected shaft 78. The pivot movement control mechanism 12 thereby rotates the object 14 about a vertical axis to move it in yaw movement. Reverse rotation of the motor 84, of course, reverses the direction of yaw movement. Since the axes through the pivot shafts 30 and 36 are mutually perpendicular to the pivot axis through shaft 78, pivoting movement about the pivot shafts 30 and 36 has no effect on the pivot movement obtained from rotating or pivoting the shaft 78.

Although the orientation of the pivot axes through shafts 30, 36 and 78 has been described as mutually perpendicular with respect to one another, special applications of the present invention include those where the particular pivot axes may be less in number than the three illustrated and those where a plurality of pivot axes are intersectably angled at angles other than mutually perpendicular angles.

Figure 5:
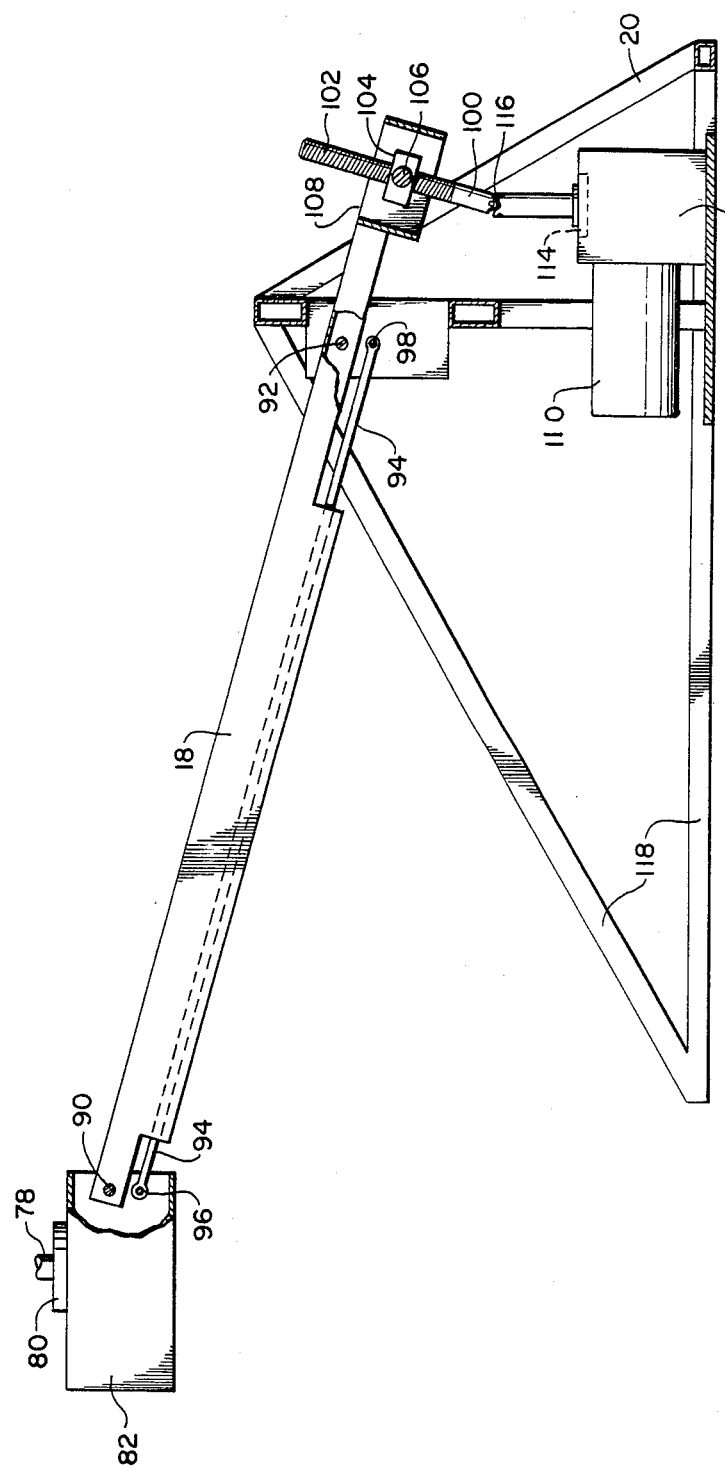
FIG. 5 is an enlarged side elevational view of the lift movement control mechanism of the orienter shown in FIG. 1, with portions broken away for clarity.

Details of the lift or translational movement control mechanism 16 are best seen in FIGS. 1 and 5. The carrier member 82 is pivotably connected to the outer free end of the lift arm 18 by a pivot shaft 90 extending through the lift arm 18. The other end of the lift arm 18 is pivotably connected by means of a lift arm pivot shaft 92 pivotably connecting to the base structure 20. The lift arm 18 is preferably of a hollow rectangular tubular construction. An elongated stabilizer arm 94 extends through the hollow interior of the lift arm 18. The outer end of the stabilizer arm 94 is pivotably connected to the carrier member 82 by an outer stabilizer shaft 96. The other end of the stabilizer arm 94 is connected by a stabilizer shaft 98 to the base structure 20. The distance between the lift arm pivot shafts 90 and 92 and the distance between the stabilizer arm pivot shafts 96 and 98 is the same. The angular orientation between the pivot points at shafts 90 and 96 is the same angular orientation which exists between the pivot points at shafts 92 and 98. Accordingly, a parallel arm linkage arrangements exists. The effect of the parallel arm linkage arrangement is to maintain the carrier member 82 and the attached lower support plate 32 in a predetermined angular orientation at all times with respect to a horizontal plane as the lift arm 18 pivots about shaft 92. Preferably, this orientation is horizontal. As a result of the parallel arm linkage arrangement, the lifting movement of the lift movement control mechanism 16 does not influence or otherwise change the pivotable orientation achieved by operation of the pivot movement control mechanism 12.

Lift actuator means pivots the lift arm 18 with respect to the base structure 20. The lift actuator means is operatively and structurally similar to the pivot actuator means for the support plates 24 and 32 with respect to the intermediate structure 26 previously described in conjunction with the pivot movement control mechanism 12 (FIGS. 2, 3 and 4). A lift pivot or actuator shaft 100 includes an upper threaded segment or portion 102. An internally threaded collar 104 is threadably received on the threaded shaft portion 102. Pivot pins 106 extend outward from the collar 104 and pivotably connect to a receptacle 108 rigidly attached at the terminal end of the lift arm 18 adjacent the pivot shaft 92. An electric motor 110 and attached gear box 112 are rigidly attached to the base structure 20. A bearing assembly 114 is rigidly attached to the gear box housing and rotationally supports the other end of the lift actuator shaft 100 at the gear box 112. The bearing 114 operates as a thrust bearing to transfer axial forces from the lift shaft 100 to the housing of the gear box 112, rather than to output shaft of the gear box. A universal joint device 116 is provided in the actuator shaft 100 between the threaded shaft portion 102 and the end operatively connected to the gear box 112. As the motor 110 is energized, the gear box 112 rotates the lift actuator shaft 100. The threaded collar 104 advances along the threaded shaft portion 102 and carries the receptacle 108 and the end of the lift arm 18 along with it. The lift arm 18 thereby pivots about the pivot shaft 92 about the base structure 20, and the end of the lift arm 18 at the carrier member 82 moves to translate the pivot movement control mechanism 12 and connected object 14 along a translational movement path which is primarily vertical. Translational movement is thereby obtained independently of any pivoting movement available from the pivot movement control mechanism.

The base structure 20 includes leg portions 118 which extend transversely outward with respect to the lift arm 18 and forward toward the free end of the lift arm 18 to which the pivot movement control mechanism 12 is connected. The legs 118 prevent the orienter 10 from tipping as the object is translationally moved and pivoted.

Figure 6:
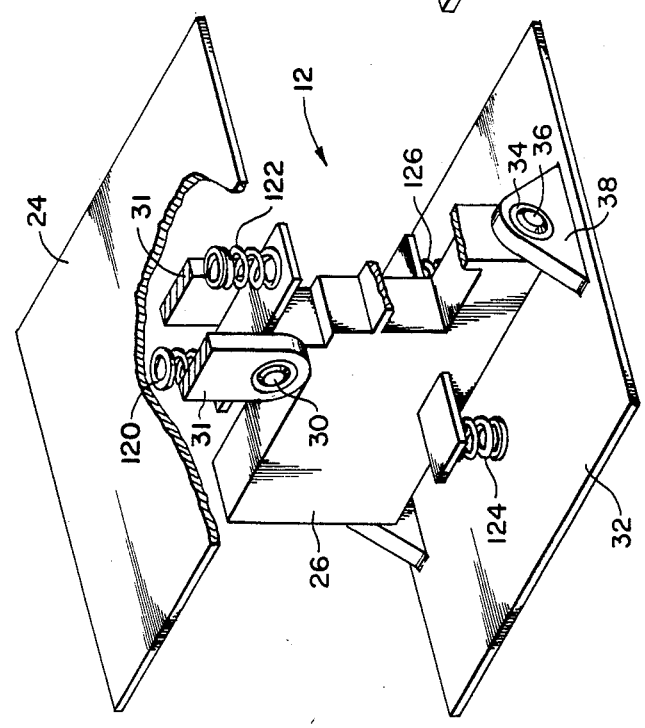
FIG. 6 is a perspective view of the pivot movement control mechanism with certain portions removed for clarity illustrating a torque means including springs optionally associated therewith.

In order to counteract some of the torque occurring on the pivot movement control mechanism 12 as a result of the center of gravity of the object 14 pivoting laterally of the pivot axes through pivot shafts 30 and 36, torque means including springs 120, 122, 124 and 126 are provided, as shown in FIG. 6. Depending on the type of object 14 (FIG. 1) which is to be pivoted by the pivot movement control mechanism 12, or the power of the electric motors 50 and 70 (FIGS. 2, 3 and 4), the torque springs 120, 122, 124 and 126 may not be required in the pivot movement control mechanism 12. As shown in FIG. 6, all of the springs are helically coiled springs which are operative to develop force between their opposite ends. The springs 120 and 122 are operatively connected between the upper plate 24 and the intermediate structure 26. All four ends of the two springs 120 and 122 are positioned at locations laterally spaced of the pivot axis through the pivot shaft 30, to thereby develop torque as a result of the force involved in compressing or expanding the helical coils of the springs 120 and 122. The spring 120 operatively connects to the upper plate 24 on one lateral side of the pivot axis through the pivot shaft 30 and the other spring 122 contacts the upper plate 24 on the opposite side of the pivot axis through the shaft 30. Preferably, the end coils of the springs 120 and 122 are rigidly connected to the upper plate 24 and the intermediate structure to thereby derive force from both expansion and contraction of the helical coils. Upon pivoting the upper plate 24 about the pivot axis through the shaft 30, one of the springs 120 or 122 compresses while the other expands. A torque is developed about the pivot shaft tending to restore the upper plate to its initial predetermined position where the torque developed as a result of the force from the springs 120 and 122 directly counteracts each other. Upon pivoting and the center of gravity of the object shifting laterally with respect to the pivot axis through the shaft 30, one spring compresses and the other expands and a torque is developed tending to counteract the torque developed as a result of the center of gravity of the object shifting laterally with respect to the pivot axis. The force required to restore the upper plate 24 to its initial predetermined position with the center of gravity centered over the pivot axis is reduced, because the torque effect from the springs assists in moving the plate to the initial predetermined position.

A similar situation exists with respect to springs 124 and 126 operatively positioned between the intermediate structure 26 and the lower plate 32. The ends of the springs 124 and 126 which contact the lower plate 32 are located on respectively opposite sides of the pivot axis through the pivot shaft 36. A torque is developed as a result of compressing and expanding the springs 124 and 126, which tends to restore the intermediate structure 26 to its initial predetermined pivoted position after it has been pivoted away from the initial position. The torque counteracts the effect of the center of gravity of the object shifting laterally with respect to the pivot axis through the shaft 36.

The significant improvements available from the present invention have previously been described.

The nature and operation of the present invention has been shown and described with a degree of specificity. It should be understood, however, that the specificity of the description has been made by way of preferred example, and that the invention is defined by the scope of the appended claims.

What is claimed is:

1. In an orienter including a support member for supporting an object therefrom, an intermediate structure pivotably connected to the support member at a pivot axis about which the support member pivots relative to the intermediate structure, and an improved pivot movement control mechanism in combination therewith comprising:

pivot actuator means operatively connected between the support member and the intermediate structure at positions laterally displaced from the pivot axis for pivoting the support member about the pivot axis relative to the intermediate structure, comprising:

an elongated pivot shaft having a segment of threads therealong;

a pivot bearing assembly operatively connecting one end of the pivot shaft to the intermediate structure, the pivot bearing assembly rotationally supporting the connected end of the pivot shaft and retaining the connected end of the pivot shaft against axial movement relative to the intermediate structure and transferring axial forces from the connected end of the pivot shaft to the intermediate structure;

a collar having threads for threadably receiving the threaded segment of the pivot shaft;

means pivotably connecting the threaded collar to the support member; and motor means operatively connected to rotate the end of the pivot shaft supported by the pivot bearing assembly, the orienter further operative for translating the object while independently allowing pivoting of the object about the pivot axis, a translational movement control mechanism in combination therewith comprising:

a base structure adapted for supporting said orienter;

an elongated lift arm operatively pivotably connected at a lift pivot point at one end thereof to the base structure;

means operatively connecting the other end of the lift arm to the intermediate member; and lift actuator means operatively connected to the base structure and the lift arm at positions laterally displaced from the lift pivot point, said lift actuator means comprising:

an elongated lift shaft having a segment of threads therealong;

a lift bearing assembly operatively connecting one end of the lift shaft to the base structure, the lift bearing assembly rotationally supporting the connected end of the lift shaft and retaining the connected end of the lift shaft against axial movement relative to the base structure and transferring axial forces from the connected end of the lift shaft to the base structure;

a collar having threads for threadably receiving the threaded segment of the lift shaft;

means pivotably connecting the threaded collar to the lift arm and motor means operatively connected to rotate the end of the lift shaft supported by the lift bearing assembly to pivot the lift arm about the base structure at the lift pivot point.

2. In an orienter as defined in claim 1, said actuator means further comprising:

a universal joint device connected in said pivot shaft between the threaded segment and the end of the pivot shaft rotationally supported and retained by the pivot bearing assembly.

3. In an orienter as defined in claim 1, further comprising torque means operatively connected between the support member and the intermediate structure and including a spring by which force is operatively derived and operative for applying torque to said support member relative to the intermediate structure to tend to restore the support member to an initial predetermined pivot position relative to the intermediate structure once the support member is pivoted away from the predetermined pivot position.

4. In an orienter as defined in claim 3, wherein:

the spring is operative to derive force between ends thereof, one end of the spring operatively contacts the support member at a position laterally spaced from the pivot axis, and the other end of the spring operatively contacts the intermediate structure at a position laterally spaced from the pivot axis.

5. In an orienter as defined in claim 4, wherein said torque means further comprises a second said spring in addition to the spring first aforementioned, one end of the second spring operatively contacts the support member at a position laterally spaced on the opposite side of the pivot axis from the position where said first spring contacts the support member, and the other end of said second spring operatively contacts the intermediate structure at a position laterally spaced from the pivot axis.

6. In an orienter as defined in claim 5, wherein said motor means comprises an electric motor.

7. In an orienter as defined in claim 1, wherein said means operatively connecting the other end of the lift arm to the intermediate structure further comprises:

means for rotationally connecting the intermediate structure to the other end of the lift arm; and means for rotating the intermediate structure relative to the other end of the lift arm, independently of pivoting of the support member relative to the intermediate structure and independently of pivoting of the lift arm at the lift pivot point.

8. An orienter for moving an object connected thereto independently about two intersectably angled pivot axes, comprising:

a first support member adapted to operatively connect to the object;
an intermediate structure;
first pivot connection means for pivotably connecting the first support member to the intermediate structure to pivot about a first pivot axis;
a second support member;
a second pivot connection means for pivotably connecting the intermediate structure to the second support member to pivot about a second pivot axis, the second pivot axis extending at an intersecting angle with respect to the first pivot axis;
first pivot actuator means operatively connected between the first support member and the intermediate structure for pivoting the first support member about the first pivot axis relative to the intermediate structure; and
second pivot actuator means operatively connected between the second support member and the intermediate structure for pivoting the intermediate structure about the second pivot axis relative to the second support member;
each of said first and second pivot actuator means comprising:
a pivot shaft having a segment of threads therealong;
a pivot bearing assembly operatively connected to one end of the pivot shaft;
and a collar having threads for threadably connecting the threaded segment of the pivot shaft;
said first pivot actuator means including means operatively connecting the pivot bearing assembly to said intermediate structure at a position laterally spaced from the first pivot axis, the pivot bearing assembly rotationally supporting the connected end of the pivot shaft and retaining the connected end of the pivot shaft against axial movement relative to the intermediate structure,
said first pivot actuator means further including means pivotally connecting the collar to the support member at a position laterally spaced from the first pivot axis;
said second pivot actuator means including means operatively connecting the pivot bearing assembly to said second support member at a position laterally spaced from the second pivot axis, the pivot bearing assembly rotationally supporting the connected end of the pivot shaft and retaining the connected end of the pivot shaft against axial movement relative to the second support member,
said second pivot actuator means further including means pivotally connecting the collar to the intermediate structure at a position laterally spaced from the second pivot axis;
the orienter further for pivoting about a third axis wherein the first and second pivot axes are mutually perpendicular with respect to one another, the third pivot axis being mutually perpendicular to the first and second axes, said orienter further comprising:
a carrier member;
means connecting the second support member to the carrier member to pivot about the third pivot axis; and
rotational drive means operatively connected between the carrier member and the second support member for pivoting the second support member relative to the carrier member about the third pivot axis, the orienter for further moving the object along a path parallel to the third pivot axis, further comprising:
a base structure adapted for supporting said orienter;
an elongated lift arm;
means for pivotably connecting the lift arm at a lift pivot point at one end thereof to the base structure;
means connecting the carrier member to the other end of the lift arm;
lift actuator means operatively connected between the base structure and the lift arm for pivoting the lift arm about the base structure at the lift pivot point, said lift actuator means comprising:
an elongated lift shaft having a segment of threads therealong;
a lift bearing assembly operatively connecting one end of the lift shaft to the base structure, said lift bearing assembly rotationally supporting the connected end of the lift shaft and retaining the connected end of the lift shaft against axial movement relative to the base structure and transferring axial forces on the lift shaft to the base structure;
a collar threadably connected to the threaded segment of the lift shaft;
means pivotably connecting the collar to the lift arm; and
motor means operatively connected to rotate the end of the lift shaft supported by the lift bearing assembly to pivot the lift arm about the base structure at the lift pivot point.

9. In an orienter as defined in claim 8, each of said first and second pivot actuator means further comprising:
a universal joint device connected in said pivot shaft between the threaded segment and the end of the pivot shaft rotationally supported and retained by the pivot bearing assembly.

10. In an orienter as defined in claim 8, further comprising first and second torque means operatively connected between the first support member and the intermediate structure and between the second support member and the intermediate structure respectively, each of the first and second torque means including a spring by which force is operatively derived to apply torque to said support members relative to the intermediate structure to tend to restore the support member to an initial predetermined pivot position relative to the intermediate structure once the support member is pivoted away from the predetermined pivot position.

11. In an orienter as defined in claim 9, wherein with respect to each torque means:
the spring is operative to derive force between ends thereof;
one end of the spring operatively contacts the support member at a position laterally spaced from the pivot axis; and
the other end of the spring operatively contacts the intermediate structure at a position laterally spaced from the pivot axis.

12. An orienter as defined in claim 8 wherein:
said means pivotably connecting the second support member to the carrier member further comprises a support shaft operatively connected to rotate the second support member when said support shaft is rotated, and a rotational bearing assembly connected to the carrier member and rotationally supporting the support shaft from the carrier member; and said rotational drive means comprises motor means connected to said carrier member and operatively connected to rotate said support shaft.

13. An orienter as defined in claim 8 wherein:

the carrier member is pivotably connected to the other end of the lift arm, and further comprising means operatively connecting the carrier member and the base structure for maintaining the carrier member in a predetermined orientation as the lift arm pivots relative to the base structure.

14. An orienter as defined in claim 13 wherein said means for maintaining the carrier member in a predetermined orientation comprises:

an elongated stabilizer arm;

means for pivotably connecting one end of the stabilizer arm to the base structure at a point laterally displaced from the pivot point at which the lift arm is pivotably connected to the base structure; and means pivotably connecting the other end of the stabilizer arm to the carrier member at a point laterally displaced from the point at which the carrier member is pivotably connected to the other end of the lift arm.

* * * * *